(12) United States Patent
Cheethirala et al.

(10) Patent No.: US 11,153,221 B2
(45) Date of Patent: Oct. 19, 2021

(54) METHODS, SYSTEMS, AND DEVICES FOR CLASSIFYING LAYER 4-LEVEL DATA FROM DATA QUEUES

(71) Applicant: Pensando Systems, Inc., San Jose, CA (US)

(72) Inventors: Madhava Cheethirala, San Jose, CA (US); Raja Tadimeti, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 16/553,947

(22) Filed: Aug. 28, 2019

(65) Prior Publication Data

US 2021/0067458 A1  Mar. 4, 2021

(51) Int. Cl.
*H04L 12/863* (2013.01)
*H04L 12/24* (2006.01)
*H04L 29/08* (2006.01)

(52) U.S. Cl.
CPC .......... *H04L 47/50* (2013.01); *H04L 41/0813* (2013.01); *H04L 69/326* (2013.01)

(58) Field of Classification Search
None
See application file for complete search history.

(56) References Cited

U.S. PATENT DOCUMENTS

| | | |
|---|---|---|
| 2006/0050640 A1 | 3/2006 | Jin et al. |
| 2006/0153179 A1 | 7/2006 | Ho et al. |
| 2008/0037420 A1 | 2/2008 | Tang |
| 2008/0181112 A1 | 7/2008 | Beck et al. |
| 2013/0204965 A1* | 8/2013 | Masputra ............... H04L 47/60 709/217 |
| 2013/0322247 A1 | 12/2013 | Li et al. |
| 2014/0164641 A1 | 6/2014 | Ye et al. |
| 2014/0177455 A1 | 6/2014 | Astigarraga et al. |
| 2015/0341273 A1 | 11/2015 | Naouri et al. |
| 2016/0374094 A1 | 12/2016 | Bakshe et al. |
| 2017/0019803 A1 | 1/2017 | Nguyen et al. |
| 2017/0078205 A1 | 3/2017 | Stalling et al. |
| 2018/0212885 A1 | 7/2018 | Contavalli et al. |
| 2018/0302328 A1 | 10/2018 | Keith et al. |
| 2019/0386913 A1* | 12/2019 | Wei ........................ H04L 47/30 |

(Continued)

FOREIGN PATENT DOCUMENTS

| | | |
|---|---|---|
| WO | WO-2019046603 A1 | 3/2019 |
| WO | WO-2019164827 A1 | 8/2019 |

(Continued)

OTHER PUBLICATIONS

PCT/US2018/048893 International Search Report and Written Opinion dated Jan. 3, 2019.

(Continued)

*Primary Examiner* — Yaotang Wang
(74) *Attorney, Agent, or Firm* — Wilson Sonsini Goodrich & Rosati

(57) ABSTRACT

Described are platforms, systems, and methods for performing queue scheduling tasks on data packet flows. In one aspect, a method comprises: retrieving a plurality of packet flows from a network stack; reconfiguring the retrieved packet flows into per-flow queues; and performing one or more queue scheduling tasks on the per-flow queues.

33 Claims, 5 Drawing Sheets

(56) References Cited

U.S. PATENT DOCUMENTS

2020/0076736 A1\* 3/2020 Tilli .................. H04L 45/38
2020/0336426 A1 10/2020 Tadimeti et al.

FOREIGN PATENT DOCUMENTS

WO     WO-2019209181 A1    10/2019
WO     WO-2020236599 A1    11/2020
WO     WO-2021041622 A1     3/2021

OTHER PUBLICATIONS

Co-pending U.S. Appl. No. 16/415,609, filed May 17, 2019.
Co-pending U.S. Appl. No. 16/779,096, filed Jan. 31, 2020.
Co-pending U.S. Appl. No. 16/842,537, filed Apr. 7, 2020.
Co-pending U.S. Appl. No. 16/860,650, filed Apr. 28, 2020.
PCT/US2020/033154 International Search Report and Written Opinion dated Aug. 26, 2020.
PCT/US2020/048127 Invitation to Pay Additional Fees dated Nov. 4, 2020.
PCT/US2020/048127 Invitation to Pay Additional Fees dated Oct. 4, 2020.
PCT/US2020/048127 International Search Report and Written Opinion dated Jan. 21, 2021.
Co-pending U.S. Appl. No. 17/000,172, inventors Pudiyapura; Ajeer Salil et al., filed on Aug. 21, 2020.
U.S. Appl. No. 16/415,609 Office Action dated May 5, 2021.
Liu et al. Offloading distributed applications onto smartnics using ipipe. Proceedings of the ACM Special Interest Group on Data Communication pp. 318-333 (2019).
PCT/US2021/015896 International Search Report and Written Opinion dated Apr. 14, 2021.

\* cited by examiner

METHODS, SYSTEMS, AND DEVICES FOR CLASSIFYING LAYER 4-LEVEL DATA FROM DATA QUEUES

BACKGROUND

Some network interface cards (NICs) available support virtual function (VF) and physical function (PF) rate limiters today. Some currently-available NICs support scheduling tasks, such as rate limiting and congestion management schemes, for data organized into queues at the VF and PF levels.

SUMMARY

Existing NICs do not support performing scheduling operations on individual Layer 4-level (L4) packet flows, such as transmission control protocol (TCP), UDP, or RDMA level flows. Thus, the NICs currently available do not offer users sufficient control on their applications and may exact heavy burdens on the networks they are connected in.

There is a need to develop a network interface card (NIC) that supports Layer 4-level (L4) data packet flows, and does not exact a heavy burden on the network. In addition, there is a need for a per-flow level rate limiting and congestion management solution. Being able to perform rate limiting and congestion management at the flow level may enable users to obtain more control on their applications.

In one aspect, disclosed herein are methods for performing queue scheduling tasks on data packet flows, comprising: a) retrieving a plurality of packet flows from a network stack; b) reconfiguring the retrieved packet flows into per-flow queues; and c) performing one or more queue scheduling tasks on the per-flow queues. In some embodiments, a), the retrieving, and b), the reconfiguring, are performed by a host, and c), the performing, is performed by a network interface card. In other embodiments, a), the retrieving, is performed by a host, and b), the reconfiguring, and c), the performing, are performed by a network interface card. In further embodiments, b), the reconfiguring, and c), the performing, are performed without involvement from the host and/or awareness of the host. In some embodiments, a), the retrieving, b), the reconfiguring, and c), the performing, are performed by a network interface card. In further embodiments, a), the retrieving, b), the reconfiguring, and c), the performing, are performed without involvement from the host and/or awareness of the host. In various embodiments, the data is a TCP, UDP, or RDMA data flow. In some embodiments, the host classifies the retrieved packet flows using a flow hash. In some embodiments, the queue scheduling tasks comprise one or more selected from the group consisting of: rate limiting, shaping, congestion management, flow pacing, and packing. In some embodiments, the method further comprises: following a), the retrieving, configuring the packet flows into a plurality of data queues at a virtual function level or physical function level. In further embodiments, the plurality of data queues comprises at least 10 data queues. In still further embodiments, the per-flow queues comprise at least 100,000 queues. In some embodiments, the queue scheduling tasks comprise a traditional scheduling task and a flow scheduling task.

In another aspect, disclosed herein are systems for performing scheduling tasks on Layer 4-level data from a host, comprising: a network stack, configured to transmit packet flows; a network driver, configured to: organize one or more packet flows into one or more queues; retrieve the one or more queues from the network driver; and reconfigure the one or more queues into per-flow queues; and a network interface controller, configured to perform one or more queue scheduling tasks on the per-flow queues. In various embodiments, the data comprises a TCP, UDP, or RDMA data flow. In some embodiments, the host classifies the retrieved packet flows using a flow hash. In some embodiments, the queue scheduling tasks comprise one or more selected from the group consisting of: rate limiting, shaping, congestion management, flow pacing, and packing. In some embodiments, the per-flow queues comprise at least 100,000 queues.

In another aspect, disclosed herein are systems for performing scheduling tasks on Layer 4-level data from a host, comprising: a network stack, configured to transmit packet flows; a network driver, configured to organize one or more packet flows into one or more queues; and a network interface controller, configured to: retrieve the one or more queues from the network driver; reconfigure the one or more queues into per-flow queues; and perform one or more queue scheduling tasks on the per-flow queues. In various embodiments, the data comprises a TCP, UDP, or RDMA data flow. In some embodiments, the network driver classifies the retrieved packet flows using a flow hash. In some embodiments, the queue scheduling tasks comprise one or more selected from the group consisting of: rate limiting, shaping, congestion management, flow pacing, and packing. In some embodiments, the per-flow queues comprise at least 100,000 queues.

In another aspect, disclosed herein are systems for performing scheduling tasks on Layer 4-level data from data queues, comprising: a network stack, configured to transmit packet flows; and a network interface controller, configured to: retrieve the one or more packet flows; reconfigure the one or more packet flows into at least one million per-flow queues; and perform one or more queue scheduling tasks on the per-flow queues. In various embodiments, the data comprises a TCP, UDP, or RDMA data flow. In some embodiments, the queue scheduling tasks comprise one or more selected from the group consisting of: rate limiting, shaping, congestion management, flow pacing, and packing. In some embodiments, the network interface controller is further configured to: following the retrieving, configure the packet flows into a plurality of data queues at a virtual function level or physical function level. In further embodiments, the plurality of data queues comprises at least 10 data queues. In some embodiments, the per-flow queues comprise at least 100,000 queues. In some embodiments, the queue scheduling tasks comprise a traditional scheduling task and a flow scheduling task.

In another aspect, disclosed herein are systems for performing scheduling tasks on Layer 4-level data from data queues, comprising: a network stack, configured to transmit packet flows; a network driver, configured to organize one or more packet flows into one or more queues; and a network interface controller, configured to: retrieve the one or more queues from the network driver; reconfigure the one or more queues into at least one million per-flow queues; and perform one or more queue scheduling tasks on the per-flow queues. In various embodiments, the data comprises a TCP, UDP, or RDMA data flow. In some embodiments, the queue scheduling tasks comprise one or more selected from the group consisting of: rate limiting, shaping, congestion management, flow pacing, and packing. In some embodiments, the per-flow queues comprise at least 100,000 queues. In some embodiments, the queue scheduling tasks comprise a traditional scheduling task and a flow scheduling task.

In another aspect, the present disclosure provides non-transitory computer readable medium comprising machine executable code that, upon execution by one or more computer processors, implements any of the methods above or elsewhere herein.

In another aspect, the present disclosure provides systems comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
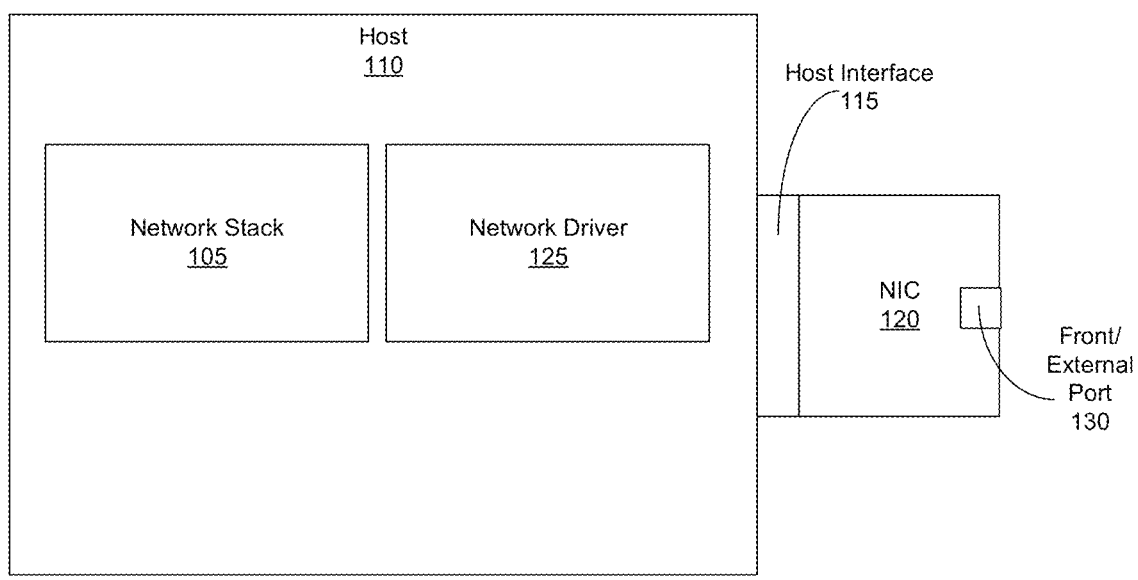
FIG. 1 shows a system for enabling users to perform scheduling tasks on particular data flows.

While various embodiments of the subject matter have been shown and described herein, it will be obvious to those skilled in the art that such embodiments are provided by way of example only. Numerous variations, changes, and substitutions may occur to those skilled in the art without departing from the subject matter described herein. It should be understood that various alternatives to the embodiments described herein may be employed.

Disclosed herein is a smart network interface card (NIC) for providing improved visibility into data flows comprising traffic moving from the host 110 through the NIC to the network. The smart network interface card operates to configure a data flow into multiple queues and apply one or more operations to the queues. The one or more operations may include applying rate limiting or congestion management schemes. The NIC is configured to operate in multiple configurations, where a host 110 machine may have varying levels of involvement in classifying data flows and enqueueing data packets.

In a network communication system, a network driver, such as an Ethernet driver, directs data packets from a particular flow on a host 110 to the NIC. The data may be transported as one or more data queues. In some cases, the data queues may or may not be configured by the host. Regardless, the NIC receives either the data queues, or a flow of data packets, and reconfigures the data into a large number of internal queues, for example, 100,000 queues, with each queue corresponding to a particular data flow. The NIC may then perform one or more flow scheduling tasks on the data after it has reconfigured it.

In a first configuration, data flows may be classified at least in part by the host 110 software. The host 110 software may be able to collect information about the data flows with high granularity. Using the collected data, the host 110 may be able to apply one or more rules to classify the packets into a large number of data queues. These may then be provided to the MC, which may implement packet flow scheduling tasks on data within these per-flow queues.

In a second configuration, the host 110 may not classify the data, but may organize it into tens of queues, at a virtual function (VF) or physical function (PF) layer. Then, the NIC itself retrieves these tens of queues to form large numbers internal queues per data flow. Then, the NIC performs scheduling tasks, such as rate limiting and congestion management tasks, on these reconfigured queues.

In a third configuration, a process for configuring data flows, used in the NIC, may be inserted in a "bump-in-the-wire" setup. In this scenario, a host 110 machine does not organize the data into queues before it is processed by the NIC. Instead, the NIC may accept incoming data flows, organize them into per-flow queues, and then implement scheduling tasks on the queues.

While currently available NICs may use round-robin, weight-based, or priority scheduling, the methods described herein may use many different packet scheduling algorithms. Depending on a type of network communication protocol used, the scheduling algorithms may be first come first serve, strict priority, earliest deadline first, generalized processor sharing, and packet-by-packet generalized processor sharing. The methods described herein may be employed with wireless communication protocols.

In this disclosure, the term "flow" may be employed to describe a particular sequence of data packets, for example, corresponding to a particular system user or entity. The flow may be sent through a particular socket connection.

FIG. 1 shows a system 100 for enabling users to perform scheduling tasks on particular data flows. The system includes a host 110, a network stack 105, a network driver 125, a host interface 115, and a network interface card (MC) 120.

The host 110 is a computing system capable of transmitting data packets across a network. The host 110 may be a desktop computer, laptop computer, or server. The host 110 may also be a mobile device, such as a smartphone or tablet computer.

The network stack 105 is a software implementation of networking protocols. The network stack 105 may be an internet protocol stack. The network stack 105 may include a TCP/IP stack, which may send and receive requests from host applications. The application may send and receive requests using TCP or UDP. The network stack 105 may interface with a device driver to define how to transport media through the network. The L4 layer protocols may include RDMA, TCP, UDP, ATP, CUDP, DCCP, FCP, IL, MPTCP, RDP, RUDP, SCTP, SPX, SST, UDP-Lite, and µTP.

The network driver 125 enables communication between the host 110 and the NIC 120, making data ready for transmission from the host 110 available to the NIC 120. The network driver 125 may facilitate the transfer of data flows from the host 110 to the NIC 120. The driver may implement queues as first-in first-out (FIFO) queues. The queues may contain descriptors which point to buffers holding packet data.

The host interface 115 connects the NIC 120 to the host. The host interface 115 may be a peripheral component interconnect express (PCIe) interface. The host interface 115 may also be another type of serial interface, such as an RS-232, SPIU, DC-BUS, UNI/O, and 1-Wire.

The network interface card connects the host 110 to the network. The NIC 120 may reconfigure data queues selected by the network driver 125. The network interface card may have a front or external port. The NIC 120 may ask the network stack 105 for data when the host 110 is ready to transmit data. The NIC 120 may perform packing operations, merging data packets together. In some embodiments, the NIC 120 includes over 100,000 transmit and receive queues. In some embodiments, the NIC 120 includes a few dozen transmit and receive queues. When data is received from the host, the NIC 120 may assign data packets into its receive queues. The NIC 120 may implement rules for assigning data packets. The NIC 120 includes a front/external port 130, through which it may send data packets to other computing devices on the network. The NIC 120 may use on-chip memory to perform the queue scheduling tasks.

In addition to rate limiting and congestion management, the system may also be configured to apply flow pacing. Flow pacing combines rate control with TCP's use of acknowledgments to trigger new data to be sent into the network. It may be performed in order to reduce burstiness of traffic flows and to allow other protocols to have similar pacing.

The system 100 may also perform flow packing. Flow packing combines multiple smaller packets into a larger packet. This reduces overhead costs with respect to data transmission. Each packet being transmitted has a header, which takes up overhead space. Multiple small packets have multiple headers associated with them and thus create more overhead than a larger packet containing the smaller packets' data, but with only one header. Flow packing may operate in cut through (while a packet is being received at its destination, the system will initiate sending a next packet).

Figure 2:
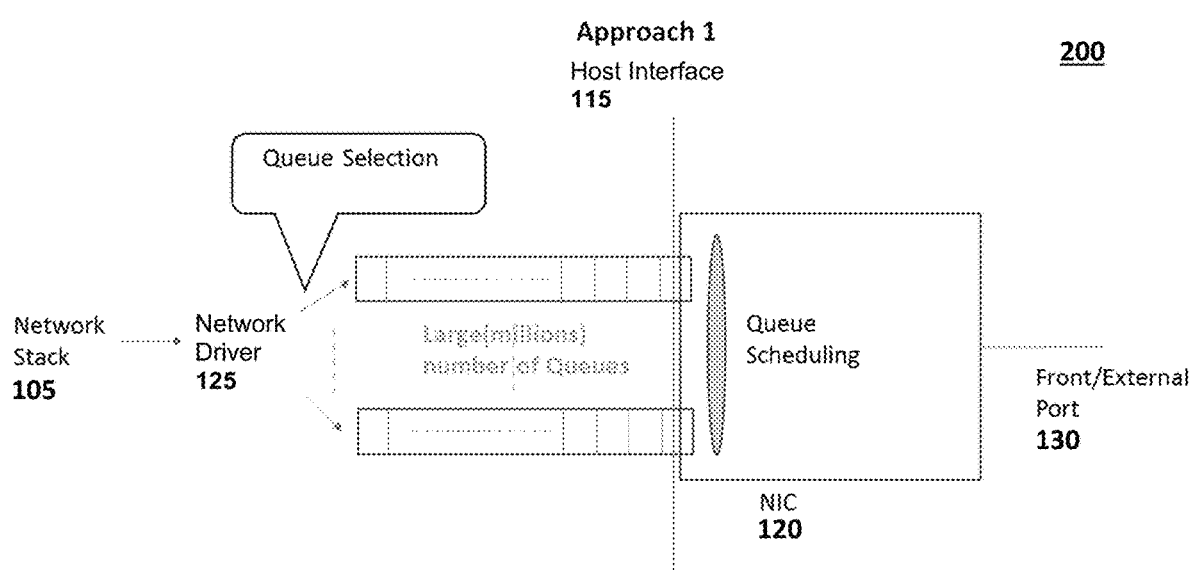
FIG. 2 shows a first operating implementation of the system of FIG. 1.

FIG. 2 shows a first operating implementation 200 of the system 100 of FIG. 1. In the implementation 200 of FIG. 2, the host 110 may implement per-flow queuing, while the NIC 120 performs scheduling tasks. The queuing may be performed by the network drivers. The host 110 may classify flows into queues based on information it receives about the flows (e.g., from a packet header or descriptor) or by implementing a hash function on the flows. For example, a hashing function may inspect information included in a packet descriptor, and implement the hashing function to place the data into a queue. Packets may also be classified based on rules. The queue scheduling tasks may be rate limiting, congestion management, shaping, or packing. In the first environment, the network stack 105 may use a field descriptor associated with a socket corresponding to a particular flow in order to get a unique queue associated with a buffer for the particular flow. The flows may be configured by the host into hundreds of thousands or millions of queues. After the flows are configured into queues by the host, the NIC 120 may perform scheduling tasks on the queues, such as congestion management tasks or rate limiting tasks.

Figure 3:
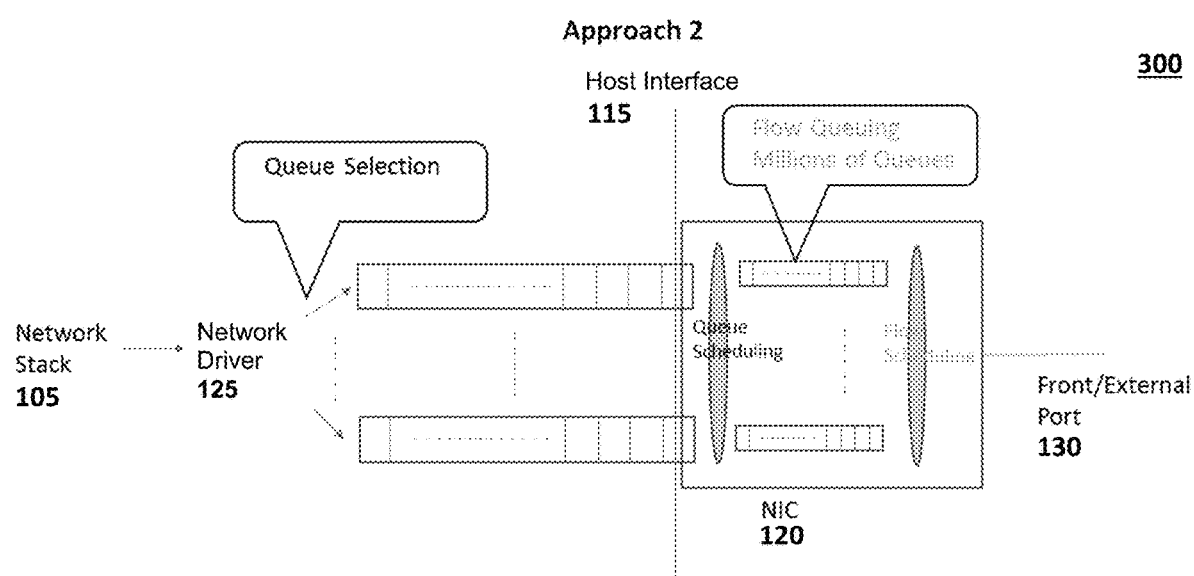
FIG. 3 shows a second operating implementation of the system of FIG. 1.

FIG. 3 shows a second operating implementation 300 of the system of FIG. 1. In the implementation 300 of FIG. 3, the host 110 is not aware of the per-flow scheduling. In this environment, the driver 125 creates a few tens of queues prior to sending the traffic to the NIC 120. The driver queues may be formed at the virtual function (VF) level or the physical function (PF) level, rather than the flow level. In some embodiments, a VF or PF may support multiple quality-of-service (QOS) or class-of-service (COS) groups. In some embodiments, to support such groups a queue per <VF, COS> or <PF, COS> is employed. The NIC 120 may then reconfigure these VF or PF queues into internal per-flow queues. The NIC 120 may have multiple layers of scheduling, based on the flow. The NIC 120 may have traditional scheduling, followed by flow queuing and flow scheduling. This type of at scheduling allows the NIC 120 to provide these fine grain features per flow. The scheduling used may be determined based on information in packet descriptors or headers. Rate limiting may be performed based on characteristics of a particular flow. For example, different flows may have different sizes, durations, rates, and burstinesses. These characteristics may be protocol-based. Different characteristics may lead to rate limiting policies using different types of algorithms.

Figure 4:
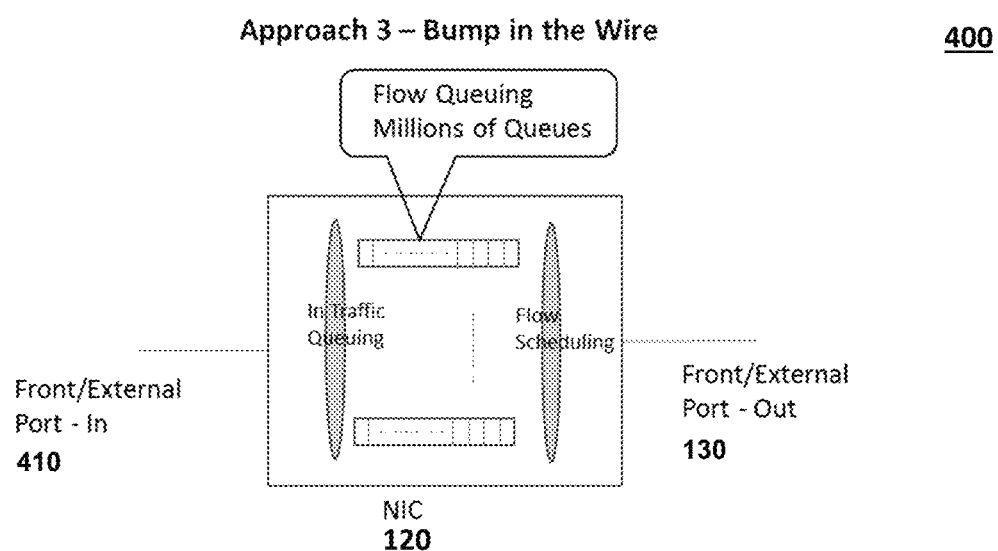
FIG. 4 shows a third operating implementation of the system of FIG. 1.

FIG. 4 shows a third operating implementation 400 of the system of FIG. 1. In the implementation 400 of FIG. 4, the MC 120 is connected to the network at input and output terminals. The third configuration may be considered a "bump in the wire" scenario. In the third configuration, there is no network driver 125 to configure queues, either at a per-flow level, a VF level, or a PF level. The NIC 120 thus may handle all of the queueing and scheduling. The NIC 120 device itself may have two network ports, a front/external port in 410 and the front/external port out 130. One port may handle incoming traffic and the other may handle outgoing traffic. Traffic entering the network input port may be classified into multiple per flow queues. The queues may number in the millions. Then, queue scheduling may be done in a similar manner as in the first and second environments.

Figure 5:
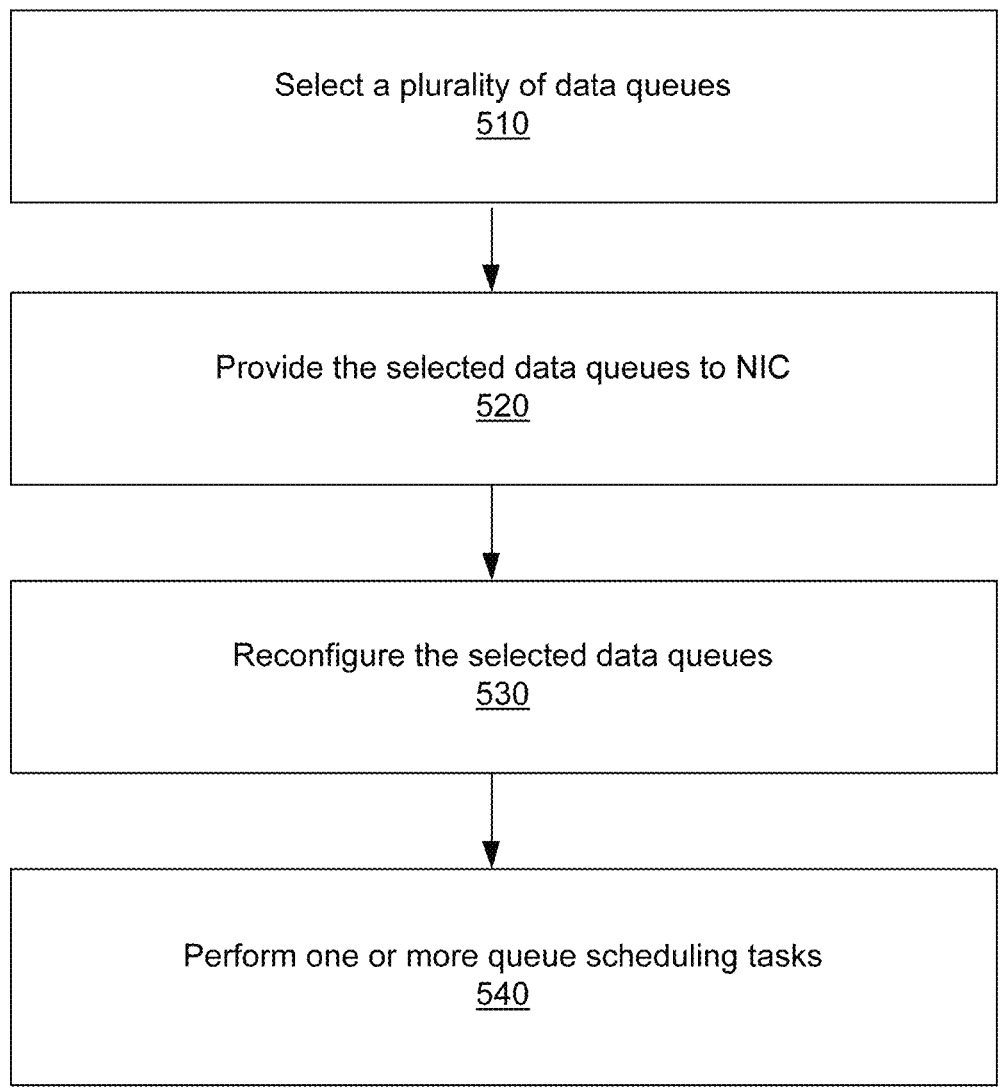
FIG. 5 shows a process flow diagram, describing queuing and scheduling tasks performed by the system.

FIG. 5 shows a process flow diagram 500, describing queuing and scheduling tasks performed by the system of FIG. 1. In the various implementations, particular tasks may be performed by either the NIC 120 or the host. FIG. 5 is only one example of a process in which such tasks may be performed. For example, FIG. 5 includes one set queuing operations followed by scheduling operations. In other implementations, flows may be queued and scheduled multiple times, either by the NIC 120 or the host.

In a first operation 510, the network driver 125 selects a plurality of data queues. Packets from flows may be added to queues by the network stack 105, to be sent across an interface 115 (e.g., a PCI interface, to the NIC). The driver queues may exist to make the data flows available to the NIC 120 for immediate transmission. The driver queues may be classified, for the purpose of rate limiting or congestion management, by the host, as in the first environment. The driver queues may also be classified by the NIC 120 after they are transmitted, as in the second and third environments.

In a second operation 520, the network driver 125 provides the selected queues to the NIC 120. In the second and third environments, the NIC 120 may classify the selected queues in order to form internal queues based on the packet flows incorporated in the selected queues. The queues may be implemented in a first-in, first-out (FIFO) manner. Packets at the beginning of the queue, in this configuration, may be received first by the NIC, where packets queued near the back may be received later.

In a third operation 530, the NIC 120 reconfigures the selected queues into at least one million generated queues. The selected queues may be PF or VF queues, which may be reconfigured into per-flow queues. There may be at least one million data flows processed by the MC. In this manner, a particular user may gain visibility into a particular flow, and implement one or more queue scheduling tasks on the particular flow, within the NIC.

In a fourth operation 540, the NIC 120 performs one or more queue scheduling tasks on the generated queues. The queue scheduling tasks may be congestion management tasks or rate limiting tasks. The tasks performed may be dependent on particular flows they are performed upon, or parameters of the flows. Information designating which type of task to be performed may be found in packet descriptors within the flows. Scheduling tasks may also include flow pacing or packing tasks. Flow scheduling disciplines may include first come, first served, priority scheduling, shortest remaining time first, fixed priority preemptive scheduling, round-robin scheduling, multilevel queue scheduling, and work-conserving.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

What is claimed is:

1. A method for performing scheduling tasks on data flows, comprising:
   a) retrieving, from an inbound interface, data flows comprising a plurality of data packets;
   b) processing the retrieved data flows to determine a metric data for each of the data flows;
   c) applying one or more rules to configure, based on the metric data, the data flows into a first set of data queues;
   d) reconfiguring, at a data flow level, the first set of data queues into a second set of data queues, wherein each of the second set of data queues is associated with a data flow from the data flows;
   e) determining at least one scheduling task for a given data queue from the second set of data queues, wherein the at least one scheduling task is determined based on a current characteristic of a data flow associated with the given data queue; and
   f) performing the at least one scheduling task on the associated data flow.

2. The method of claim 1, wherein a) through c) are performed by a host, and wherein d) through f) are performed by a network interface card.

3. The method of claim 2, where d) through f) are performed without involvement from the host.

4. The method of claim 1, wherein the given data flow comprises Transmission Control Protocol (TCP), User Datagram Protocol (UDP), or Remote Direct Memory Access (RDMA).

5. The method of claim 1, wherein the one or more rules comprise a flow hash.

6. The method of claim 1, wherein the at least one scheduling task comprise one or more selected from the group consisting of: rate limiting, shaping, congestion management, flow pacing, and packing.

7. The method of claim 1, wherein the at least one scheduling task comprises multiple layers of scheduling, and wherein the multiple layers of scheduling comprise traditional scheduling followed by flow queuing and flow scheduling.

8. The method of claim 1, wherein the metric data for the data flow is determined based on descriptors or headers of each of the data packets.

9. The method of claim 1, wherein the given data flow corresponds to a system user or a system entity.

10. The method of claim 1, wherein the data flows are sent through a socket connection before being retrieved.

11. The method of claim 1, wherein the at least one scheduling task is performed on the associated data flow using on-chip memory.

12. The method of claim 1, wherein the metric data comprises a field descriptor associated with a socket corresponding to each of the data flows.

13. The method of claim 1, wherein the at least one scheduling task is determined based on packet descriptors within the associated data flow.

14. The method of claim 1, comprising:
   after performing the at least one scheduling task, providing the data packets to other computing devices via an external port connected to a network.

15. The method of claim 1, wherein the at least one scheduling task comprises rate limiting, packet shaping, congestion management, flow pacing, or flow packing.

16. The method of claim 1, wherein the first set of data queues and the second set of data queues are different.

17. The method of claim 1, wherein the second set of data queues has a greater number of queues than the first set of data queues.

18. The method of claim 1, wherein reconfiguring the first set of data queues into the second set of data queues comprises selecting at least one data queue from the first set of data queues to be reconfigured into one or more data queues at the data flow level.

19. A system for performing scheduling tasks on Layer 4-level data flows, comprising:
   a) a network stack, configured to transmit the data flows each comprising a plurality of data packets;
   b) a network driver, configured to:
      i) process the data flows to determine a metric data for each of the data flows; and
      ii) apply one or more rules to configure, based on the metric data, the data flows into a plurality data queues, wherein each of the plurality data queues is associated with one of the data flows; and
   c) a network interface controller, configured to:
      i) determine at least one scheduling task for a given data queue from the plurality of data queues, wherein the at least one scheduling task is determined based on a current characteristic of a data flow associated with the given data queue; and ii) perform the at least one scheduling tasks on the associated data flow.

20. The system of claim 19, wherein the given data flow comprises Transmission Control Protocol (TCP), User Datagram Protocol (UDP), or Remote Direct Memory Access (RDMA).

21. The system of claim 19, wherein the one or more rules comprise a flow hash.

22. The system of claim 19, wherein the at least one scheduling task comprise one or more selected from the group consisting of: rate limiting, shaping, congestion management, flow pacing, and packing.

23. The system of claim 19, wherein the network stack comprises an implementation of networking protocols.

24. The system of claim 19, wherein the network stack comprises an internet protocol stack.

25. A system for performing scheduling tasks on Layer 4-level data flows, comprising:
   a) a network stack, configured to transmit the data flows each comprising a plurality of data packets;
   b) a network driver, configured to organize the data flows into a first set of data queues; and
   c) a network interface controller, configured to:
      i) retrieve the first set of data queues from the network driver;
      ii) reconfigure the first set of data queues into a second set of data queues by:
         A) processing the first set of data queues to determine a metric data for each of the data flows; and
         B) applying one or more rules to classify, based on the metric data, the data flows into the second set of data queues, wherein each of the second set of data queues is associated with one of the data flows;
      iii) determine at least one scheduling task for a given data queue from the second set of data queues, wherein the at least one scheduling task is determined based on a current characteristic of a data flow associated with the given data queue; and
      iv) perform the at least one scheduling tasks on the associated data flow.

26. The system of claim 25, wherein the given data flow comprises Transmission Control Protocol (TCP), User Datagram Protocol (UDP), or Remote Direct Memory Access (RDMA).

27. The system of claim 25, wherein the one or more rules comprise a flow hash.

28. The system of claim 25, wherein the at least one scheduling task comprise one or more selected from the group consisting of: rate limiting, shaping, congestion management, flow pacing, and packing.

29. The system of claim 25, wherein the per flow queues second set of data queues comprise at least 100,000 queues.

30. The system of claim 25, wherein the first set of data queues comprises at least ten data queues.

31. The system of claim 25, wherein the first set of data queues are configured at a virtual function level or physical function level.

32. The system of claim 25, wherein the first set of data queues and the second set of data queues are different.

33. The system of claim 25, wherein the second set of data queues has a greater number of queues than the first set of data queues.

* * * * *